(12) United States Patent
Stahl et al.

(10) Patent No.: US 7,818,449 B2
(45) Date of Patent: Oct. 19, 2010

(54) MECHANISM FOR PROVIDING QUALITY OF SERVICE IN A NETWORK UTILIZING PRIORITY AND RESERVED BANDWIDTH PROTOCOLS

(75) Inventors: Thomas Anthony Stahl, Indianapolis, IN (US); Izzat Hekmat Izzat, Carmel, IN (US); Thomas Patrick Newberry, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 468 days.

(21) Appl. No.: 10/526,412

(22) PCT Filed: Sep. 3, 2003

(86) PCT No.: PCT/US03/27392

§ 371 (c)(1),
(2), (4) Date: Mar. 2, 2005

(87) PCT Pub. No.: WO2004/023323

PCT Pub. Date: Mar. 18, 2004

(65) Prior Publication Data

US 2006/0168337 A1    Jul. 27, 2006

Related U.S. Application Data

(60) Provisional application No. 60/407,819, filed on Sep. 3, 2002.

(51) Int. Cl.
*G06F 15/16* (2006.01)
(52) U.S. Cl. .................................... 709/238
(58) Field of Classification Search ................. 709/238, 709/240
See application file for complete search history.

(56) References Cited

U.S. PATENT DOCUMENTS 5,930,259 A    7/1999    Katsube et al. ............. 370/409

(Continued)

FOREIGN PATENT DOCUMENTS

JP    11-122288    4/1999
WO    WO 01/74096    10/2001

OTHER PUBLICATIONS

Search Report Dated Jan. 28, 2004.

(Continued)

*Primary Examiner*—Asad M Nawaz
*Assistant Examiner*—Jason Recek
(74) *Attorney, Agent, or Firm*—Robett D. Shedd; Joseph J. Opalach; Jerome G. Schaefer (57) ABSTRACT

An apparatus for providing reserved connections between end stations, in a network, such as the Internet, capable of providing prioritized communications, comprises a switch in packet communications with end stations. The switch detects and forwards packets that contain prioritized data for priority processing, and packets that include requests for reserved connections according to a given reservation protocol. Output queues associated with egress ports of the switch correspond to different priorities associated with received priority packets. An additional output queue is associated with reserved connection data packets. In response to a reserved connection request, the switch determines if sufficient bandwidth exists in the switch to establish a reserved path within the network, and if so, allocates the and width for the reserved connection. In response to each received packet, the switch determines whether the packet is associated with the reserved connection and forwards those packets to the additional output queue on the egress port associated with the reserved connection path for transport to the intended destination.

17 Claims, 4 Drawing Sheets

U.S. PATENT DOCUMENTS

| | | | |
|---|---|---|---|
| 5,946,311 A | 8/1999 | Alexander, Jr. et al. | 370/395.53 |
| 6,021,263 A | 2/2000 | Kujoory et al. | 709/232 |
| 6,038,233 A | 3/2000 | Hamamoto et al. | |
| 6,058,113 A | 5/2000 | Chang | 370/390 |
| 6,094,431 A * | 7/2000 | Yamato et al. | 370/395.21 |
| 6,101,549 A | 8/2000 | Baugher et al. | 709/238 |
| 6,104,700 A | 8/2000 | Haddock et al. | 370/235 |
| 6,125,397 A | 9/2000 | Yoshimura et al. | 709/235 |
| 6,147,970 A | 11/2000 | Troxel | 370/235 |
| 6,181,947 B1 | 1/2001 | Du et al. | |
| 6,286,052 B1 | 9/2001 | McCloghrie et al. | 709/238 |
| 6,314,098 B1 | 11/2001 | Masuda et al. | 370/392 |
| 6,314,464 B1 | 11/2001 | Murata et al. | 709/226 |
| 6,330,236 B1 | 12/2001 | Ofek et al. | 370/369 |
| 6,336,129 B1 | 1/2002 | Ise et al. | 709/201 |
| 6,356,565 B1 | 3/2002 | Bouyer et al. | 370/468 |
| 6,434,624 B1 | 8/2002 | Gai et al. | 709/232 |
| 6,493,317 B1 | 12/2002 | Ma | 370/237 |
| 6,496,479 B1 | 12/2002 | Shionozaki | 370/230 |
| 6,563,793 B1 * | 5/2003 | Golden et al. | 370/236 |
| 6,570,873 B1 * | 5/2003 | Isoyama et al. | 370/375 |
| 6,657,999 B1 | 12/2003 | Brewer | |
| 6,678,248 B1 * | 1/2004 | Haddock et al. | 370/235 |
| 6,745,246 B1 * | 6/2004 | Erimli et al. | 709/238 |
| 6,765,914 B1 * | 7/2004 | Jain et al. | 370/395.31 |
| 6,771,661 B1 * | 8/2004 | Chawla et al. | 370/468 |
| 6,968,374 B2 | 11/2005 | Lemieux et al. | |
| 7,016,676 B2 | 3/2006 | Walke et al. | |
| 7,167,648 B2 * | 1/2007 | Heinz et al. | 398/58 |
| 7,171,121 B1 | 1/2007 | Skarica et al. | |
| 7,352,726 B2 | 4/2008 | Fujisawa | |
| 2002/0016837 A1 | 2/2002 | Naudus | |
| 2002/0031142 A1 * | 3/2002 | Metin et al. | 370/463 |
| 2003/0223442 A1 * | 12/2003 | Huang et al. | 370/412 |
| 2004/0081197 A1 * | 4/2004 | Liu | 370/468 |
| 2004/0213206 A1 * | 10/2004 | McCormack et al. | 370/352 |

OTHER PUBLICATIONS

Eklund, Carl, et al., "IEEE Standard 802.16: A Technical Overview of the WirelessMAN Air Interface for Broadband Wireless Access", IEEE Communications Magazine, Jun. 2002, p. 98-107.

Johansson, P., "IPv4 over IEEE 1394", Network Working Group Request for Comments, Dec. 1999, p. 1-29.

Information Sciences Institute, University of Southern California, "Transmission Control Protocl DARPA Internet Program Protocol Specification", RFC: 793, Sep. 1981, p. 1-88.

Supplementary European Search Report dated Jan. 1, 2010.

\* cited by examiner

MECHANISM FOR PROVIDING QUALITY OF SERVICE IN A NETWORK UTILIZING PRIORITY AND RESERVED BANDWIDTH PROTOCOLS

RELATED APPLICATIONS

This application claims the benefit, under 35 U.S.C. §365 of International Application PCT/US03/27392, filed Sep. 3, 2003, which was published in accordance with PCT Article 21(2) on Mar. 18, 2004 in English and which claims the benefit of U.S. provisional patent application Ser. No. 60/407,819, filed Sep. 3, 2002.

FIELD OF THE INVENTION

The present invention relates to communication systems generally and, more particularly, to a method and apparatus for providing quality of service (QoS) in a local or wide area network or across networks.

BACKGROUND OF THE INVENTION

The Internet has traditionally provided support for "best effort" traffic only. That is, traffic will be propagated along a path from a source to a destination depending on the congestion or lack thereof existing at each "hop" (typically a router) along the way. If there is little congestion, the traffic will be propagated quickly. If the path is heavily congested, traffic will be buffered (usually first-in-first-out) at congested locations until propagation is possible, which may substantially delay the traffic. Moreover, there is no way for a sender to know ahead of time whether the desired transmission will succeed or fail. This is because Internet traffic follows a "thread-the-needle" approach, wherein each hop or router knows only about the next hop downstream. If traffic at the next hop is extremely congested, the router will nevertheless attempt to forward traffic thereto without searching for an alternate route around it. If the traffic can't be forwarded within a timeout period, the transmission will fail.

The existing Internet "best effort" design is suitable for low priority traffic where transmission latency is acceptable. However, with the proliferation of new technologies using real time applications such as video conferencing, Internet telephony, and other audio/video (A/V) services, guaranteed quality of service (QoS) with minimal and predetermined transmission latency has become increasingly desired. Such service is not possible with the traditional "best effort" design. Ethernet QoS mechansims to assure AV service packets generated on the Ethernet or Internet are delivered in a timely manner are desired. For native Ethernet/IP traffic, priority based schemes are often used, partially due to their simplicity.

Recently, protocol-based QoS solutions have been attempted. One such solution is Resource Reservation Protocol (RSVP), which is an application layer protocol. RSVP is described in R. Braden et al., "Resource ReSerVation Protocol (RSVP)—Version 1 Functional Specification," RFC 2205, September 1997. Presently, RSVP must be implemented in advanced routers at each hop along the path between sender and receiver. RSVP is designed for reserving resources along paths stretching across multiple networks. Since it is an application layer protocol, it can not be understood or implemented in layer 2 devices such as switches within a local network that often separate a sender or receiver from their gateways to other networks.

A device and mechanism capable of implementing QoS and reserving bandwidth for establishing a path from a source device to a destination device within a network and for transmitting both reserved, and prioritized packet data from output queues within the device, is desired.

SUMMARY OF THE INVENTION

An apparatus for providing reserved connections between end stations, in a network capable of providing prioritized communications, comprises a switch in packet communication with the end stations. The switch is adapted to detect and forward packets that contain prioritized data for priority processing, and packets that include requests for reserved connections according to a given reservation protocol. The switch includes a plurality of output queues associated with egress ports of the switch that correspond to different priorities associated with received priority packets, and at least one additional output queue associated with reserved connection data packets. The switch is operable for, in response to a reserved connection request, determining whether there is sufficient bandwidth available to establish a reserved path within the network, and if so, allocating the bandwidth for the requested reserved connection. The switch is further operable for, in response to each packet received at the input of the switch, determining whether the packet is associated with the reserved connection and forwarding those packets to the additional output queue on the egress port associated with the reserved connection path for transport to the intended destination.

DETAILED DESCRIPTION

Figure 1:
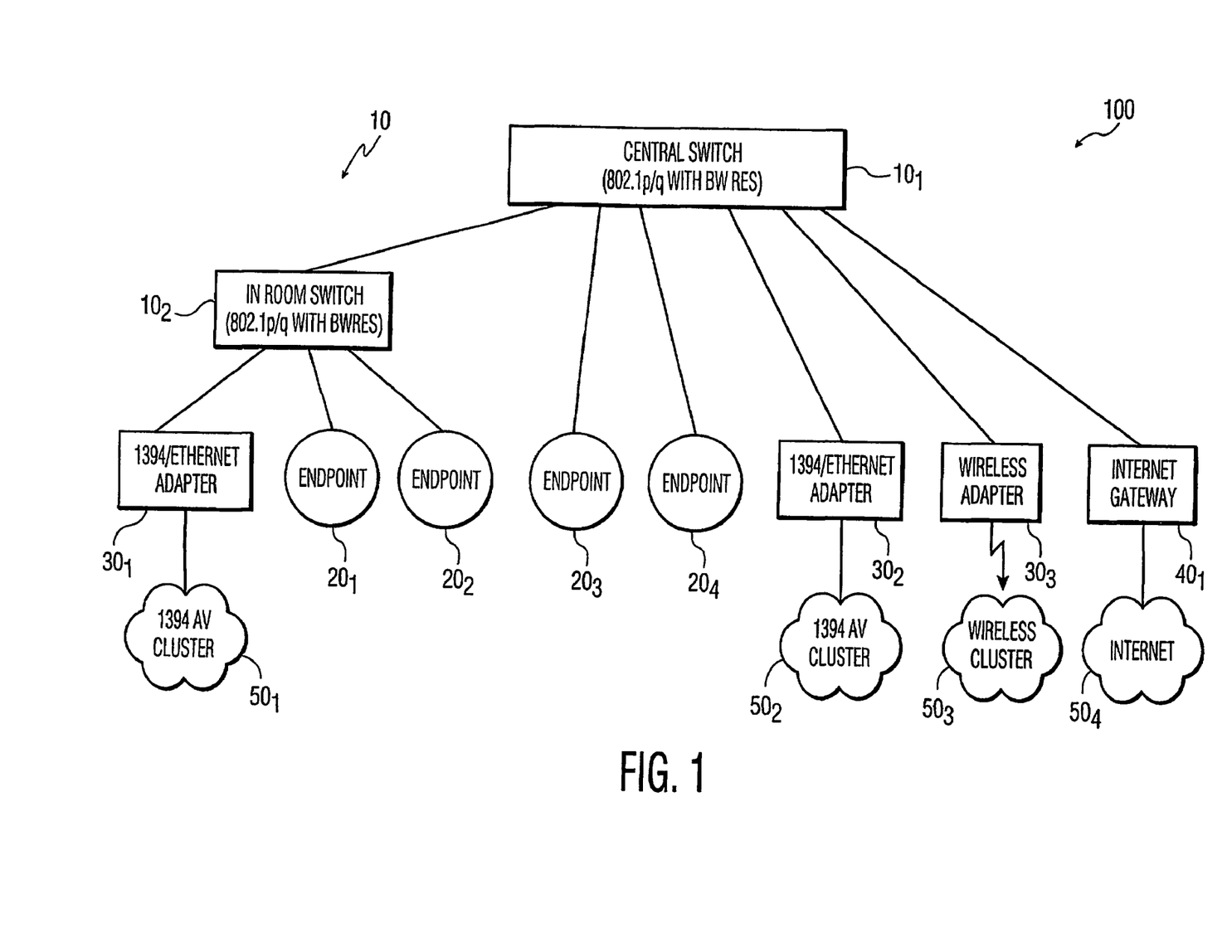
FIG. 1 is an exemplary illustration of a high level architecture for implementing reserved bandwidth connections between network devices utilizing switches according to an embodiment of the present invention.

Referring now to FIG. 1, there is shown a system 100 such as a home network system comprising one or more switches, indicated generally as 10, for receiving and forwarding packets in an ethernet-based network between end stations. Such end stations include one or more ethernet endpoint devices 20, adapters 30, and gateway 40. An end station or endpoint device may be any one of a number of consumer electronic devices, including but not limited to servers, digital televisions and monitors, MP3 and DVD devices, printers and print serves, Personal computers (PCs) and the like. Each of these devices has an associated IP address, physical address and subnet mask, as is understood in the art.

In one configuration, the one or more switches 10 comprises a first switch $10_1$ and a second switch $10_2$ operable to communicate with one another via network protocols, and with corresponding end stations over a local area network (LAN) or wide area network (WAN). In the exemplary embodiment of FIG. 1, the adapters labeled generally as 30 comprise IEEE1394 etherent adapters $30_1$, $30_2$ and wireless adapter $30_3$. Each of endpoint devices $20_1$, $20_2$, and adapter $30_1$ are in packet communication with switch $10_2$. Adapter $30_1$ operates to forward packets from/to 1394 AV cluster $50_1$ Endpoint devices $20_3$, $20_4$, adapter $30_2$ and $30_3$ and internet gateway 40 are in packet communication with switch $10_1$. Adapter $30_2$ operates to forward packets from/to 1394 AV cluster $50_2$ while wireless adapter $30_3$ operates to forward packets from/to wireless cluster $50_3$ using appropriate transfer protocols. Internet gateway 40 operates to transfer packet data to/from end point devices connected via internet network $50_4$.

According to an aspect of the present invention, each switch 10 is an 802.1 p/q compliant switch adapted for detecting and forwarding packets that contain prioritized data for priority processing, as well as packets that include requests for reserved connections between end stations according to a given reservation protocol. Typically, the application layer portion of such application level messages as reservation request messages are transparent to conventional switches. However, in accordance with an aspect of the present invention, each switch is operative to determine both reservation protocol bandwidth request messages and initiate a reserved connection, as well as determine packet stream data associated with a reserved connection packet message, and forward the packet to the corresponding highest priority output queue on the appropriate switch output port.

Switch 10 is configured with functionality in accordance with IEEE 802.1D section 7 requirements for switch devices. In addition, switch 10 of the present invention comprises one or more additional output queues for each egress port for accommodating reserved connection packet data. The switch is also operative to maintain/reserve a certain percentage of bandwidth (e.g. 50%) for 802.1 p/q traffic and best effort traffic. In an exemplary embodiment, such reservation protocol may be RSVP or a variant thereof. Each switch 10 is a layer 2 or layer 3 device that operates to receive IP packets and parse the appropriate information to determine whether the particular packet contains a bandwidth reservation request. In one configuration, switch 10 is configured to index past the ethernet, IP and TCP header information and to examine protocol header information to determine if the message is a bandwidth reservation request message. If it is not, the switch operates to forward the packet onto one of its corresponding output queues associated with a corresponding one of its output ports according to the priority of the packet. If the message is a bandwidth reservation message, switch 10 performs a series of functions for establishing a connection path between the initiating end station and the destination end station for packet communication.

As shown in FIG. 1, the architecture of the present invention provides that no adapters are needed for native ethernet devices, with adapters needed only between IEEE1394 or wireless clusters and the ethernet. The system of FIG. 1 further provides for establishing such reserved connection and stream transmission via direct connections with switches in a cascading manner and on an individual switch basis, without the need for additional external processes and connection managing software that require additional memory and complexity.

Figure 2A:
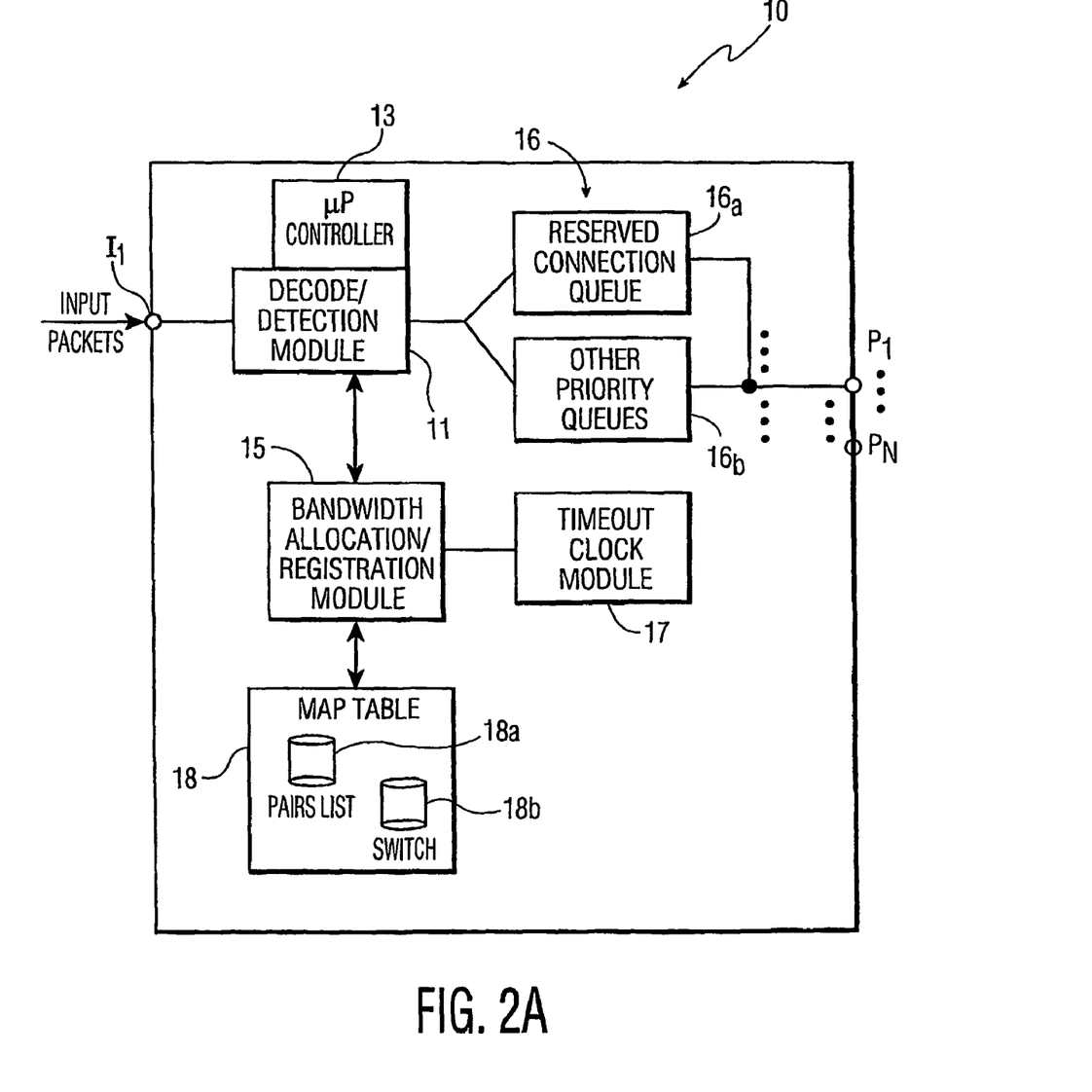
FIG. 2A is an exemplary block diagram of the major functional components of a switch for implementing the reserved bandwidth connection process according to an embodiment of the present invention.

FIG. 2A is an exemplary block diagram of a switch 10 adapted to implement the local network QoS mechanism including priority and reserved bandwidth services according to an aspect of the present invention. Switch 10 includes an input port $I_1$ for receiving packets from, for example, an upstream device (or downstream device) such as an originating end station (or a destination end station or downstream intermediate switch). The ethernet packets contain source and destination MAC addresses, destination IP address; source IP address, port number, priority, and the like. The switch includes detection/decoding software module 11 in operative communication with microprocessor controller 13 and having functionality for processing the received IP packets and indexing past the ethernet, IP, and TCP headers to detect whether the received packet includes a request for a reserved connection according to a given reservation protocol. The reservation request message includes source and destination MAC addresses of the sending device and receiving device, the source and destination IP addresses, application port number contained in the header (e.g. TCP or UDP header) to assist in defining the particular signal stream, in addition to the desired bandwidth, in bits per second, for example.

It should be understood that the system of the present invention provides for flexibility in determining the type of addressing and processing required based on the particular network domain to establish a reserved connection path and determine each of the end devices. For example, the system of the present invention, when implemented on a homogeneous Ethernet LAN, can utilize MAC addresses to determine each of the end stations associated with the originating and destination devices. In this case, when the ultimate end device is on an IEEE1394 cluster, the adapters shown in FIG. 1 operate as the endpoints in the network configuration. In another configuration, such as a heterogeneous network, a switch which determines and stores IP addresses received at its input, can determine the endpoints of devices outside its ethernet network via the adapters shown in FIG. 1, which operate as another switch 10 in this configuration. In this case, the endpoint in the network configuration is the end device on the cluster, as determined by the IP address information.

If the packet is a bandwidth request message for establishing a reserved path, allocation software module 15 responsive to the detection of a request for a reserved connection, determines whether there is sufficient available bandwidth for the requested connection and, if so, allocates the required bandwidth for establishing the reserved connection at the switch, and forwards the allocation request message to the next downstream device. Internal mapping table 18 includes a connection pairs list memory 18a and switch table memory 18b. The switch processor and detector, in addition to detecting and processing sessions using existing and emerging reservation protocols such as RSVP as described above, performs conventional functions of forwarding packets between ports of the switch in accordance with addresses in the packet headers and the contents of its standard switch table 18b. Switch 10 further compares the addresses in the packet headers with the addresses contained in connection pairs list memory 18a. If the source and destination addresses of an incoming packet match both addresses of one of the address pairs stored in its connection pairs list, the packet is placed on the reserved connection output queue associated with a particular egress port for forwarding to the port associated with the destination address.

Figure 2B:
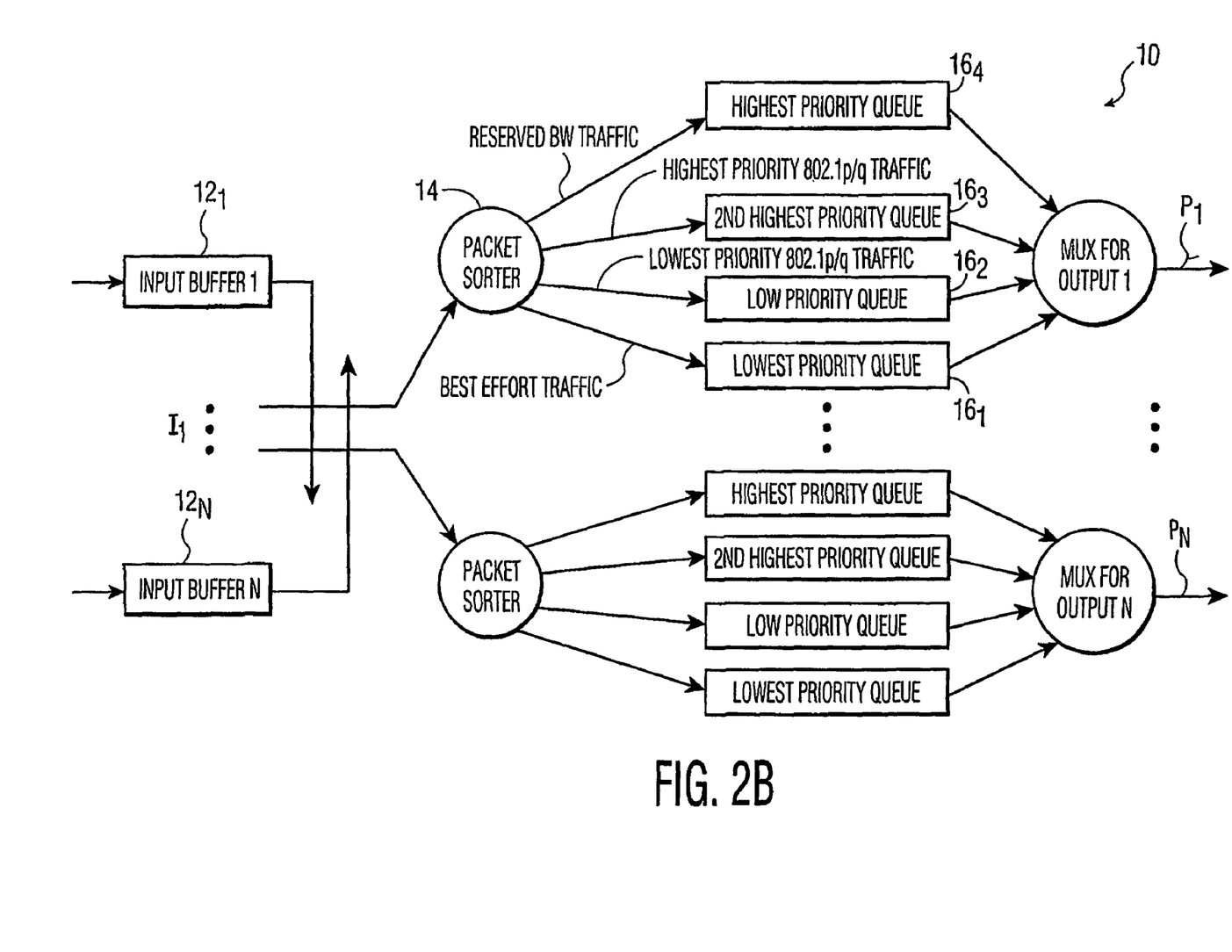
FIG. 2B is a high level block diagram of the switch of FIG. 2A illustrating the multiple output queues including an output queue for reserved connection packet data according to an embodiment of the present invention.

Each switch 10 in the cascade of switches configured in the local area network detects packets and determines whether the packet comprises a reservation bandwidth request to cause the switch to initiate the reservation process. When no reservation request message is input, the switch next determines based on the packet information whether the packet contains reserved connection data. If so, the packet is forwarded to the highest priority output queue for delivery to a corresponding output port. Otherwise, the switch processes the data according to 802.1 user priority levels and provides the packet on the corresponding output queue, as best shown in FIG. 2B. More particularly, once the switch determines that the input packet is not a bandwidth reservation request message, the switch compares the pair addresses stored in memory with input packet information. If the pairs match and the switch is within a set bandwidth, the particular packet is sent to the reserved bandwidth output queue $16_4$ (see FIG. 2B). If, on the other hand the pairs match (indicative of a reserved bandwidth connection) but the bandwidth from the associated pairs is exceeded, then the packet is discarded. Finally, if the switch determines that the pairs are not in the reserved connection bandwidth table, then the switch places the packet in the proper output queue that matches the priority of the 801.p/q field of the packet header.

Each time a packet belonging to a reserved connection is forwarded by switch 10, it resets a flag associated with that connection in connection pairs list 18a. Accordingly, switch 10 can also include functionality to periodically review the list of reserved connections for inactive sessions. For inactive sessions, a message can be sent to both upstream and downstream devices identifying the reserved connection and indicating bandwidth release for all switches in the path for that reservation. For example, bandwidth allocation/reservation interface module 15 receives bandwidth reservation release requests from devices (e.g. downstream devices) that contain the MAC addresses of the hosts/devices involved in the reserved circuit connection that is to be released. Upon receipt of such a request, the switch allocation module deletes the information in connection pairs list 18a corresponding to the released connection and sends a corresponding message identifying the bandwidth release and session termination to its corresponding attached upstream device on the network. Switch 10 may also include clock module 17 for determining whether a response has been received from a downstream device within a predetermined time interval required for establishing or maintaining a reserved connection. In the event that such response is not received, a control signal from module 17 may be sent to the allocation module 15 to take appropriate action (e.g. send another request, terminate connection and free bandwidth, etc.)

FIG. 2B provides a schematic illustration of the priority queues contained within switch 10 according to an aspect of the present invention. Referring now to FIG. 2B, switch 10 is adapted to implement the local network QoS mechanism including priority and reserved bandwidth services according to an aspect of the present invention. As mentioned above, switch 10 includes an input port $I_1$ for receiving packets from a device including, for example, an upstream device such as an originating end station. The ethernet packets contain source and destination MAC addresses, destination IP address; source IP address, port number, priority, and the like. The switch includes detection/decoding software functionality for processing the received IP packets and indexing past the ethernet, IP, and TCP headers to detect whether the received packet includes a request for a reserved connection according to a given reservation protocol. If the packet is a bandwidth request message for establishing a reserved path, allocation software responsive to the detection of a request for a reserved connection determines and allocates sufficient bandwidth for establishing the reserved connection at the switch and forwards the allocation request message to the next downstream device. A packet sorter 14 responsive to each of the packets received at the input port $I_1$ via input buffer arrangement 12 operates to determine packet type and/or packet priority. The sorting module places each packet in a corresponding output queue $16_1$, $16_2$, $16_3$, corresponding to the priority of the packet when the packet type received is a priority type (or best effort) traffic packet, and places received reserved connection data packets on an additional output queue $16_4$ when the packet type received is a reserved connection type. The plurality of output queues 16 are associated with each of egress ports P1, . . . , PN. Each of the output queues correspond to different priorities associated with the received priority packets, and the one (or more) additional output queue $16_4$, is associated with reserved connection data packets for providing the highest priority throughput.

Figure 3:
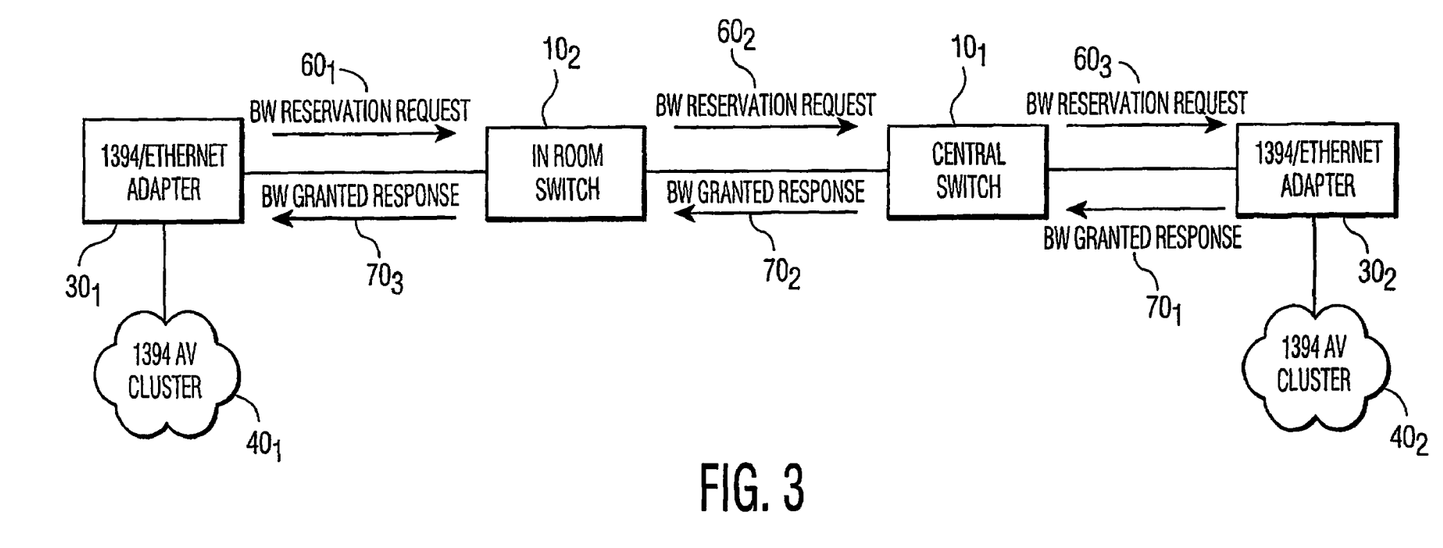
FIG. 3 is an exemplary block diagram illustrating the bandwidth reservation process flow according to an embodiment of the present invention.

FIG. 3 is an exemplary block diagram illustrating the bandwidth reservation process flow according to an embodiment of the present invention. As shown in FIG. 3, wherein like reference numerals of FIG. 1 correspond to like parts, ethernet adapter $30_1$ submits a bandwidth (BW) reservation request 60 within an ethernet packet having a destination address associated with endpoint adapter $30_2$ for establishing a reserved bandwidth connection with a device connected in 1394AV cluster $40_2$. Switch $10_2$ intercepts or otherwise receives reservation request 60 and determines, based on the request, whether it has sufficient available bandwidth to accommodate the connection. If it does, the switch marks the requested amount of bandwidth as pending and forwards the request downstream to the next device for establishing the reserved connection.

In the embodiment shown in FIG. 3 (and FIG. 1) switch $10_1$ represents the next device, which receives the forwarded bandwidth reservation request message and performs the same processing as described above with respect to switch $10_2$ to determine if the switch device has sufficient available bandwidth to establish the reserved connection. If it does, the switch transmits the bandwidth reservation request message to end device $30_2$ to process the bandwidth request. If the end device can allocate the bandwidth necessary for the requested transmission, such as a video stream, then it sends a bandwidth allocated Response (BA) message 70 back upstream. Switch $10_1$ intercepts the response and performs its own BW allocation by registering the previously pending bandwidth as associated with the requested A/V stream, and transmits the BA message upstream to switch $10_2$ which, upon determining that BW for the downstream switch has been allocated, in turn allocates its switch BW and forwards the message to originating device $30_1$. An output queue $16_4$ (see FIG. 2B) having the highest priority within each switch is established and associated with a corresponding output port on each of the switches within the reserved path between end stations for ensuring QoS.

Thus, a sender or originating end station device (e.g. $30_1$) connected to 1394 AV cluster $40_1$ desiring to establish a connection having a specified bandwidth or latency with a remote device on 1394 AV cluster $40_2$ coupled to end station device $30_2$ issues a BW request message 60. The message must be processed at each switch $10_1$, $10_2$, etc, or adapter e.g. $30_2$) in the path between the sender and the respective receiver. Each switch determines its availability, including the port on which the path is to be established, and updates its own internal tables (e.g. state tables) for the connection. Each switch determines which egress port is the proper one for a reserved connection packet based on an internal mapping table that it maintains. The switch learns which port devices are on by examining source addresses over time. These internal mapping tables or switch tables are used to determine the direction in which to forward the BW request message. In one configuration, if the destination address is already known or associated with a given one of the egress ports, the switch sends the BW message only on that port. If, however, the destination address is not known, then the switch is operable for broadcasting the BW request message on all egress ports. While this approach may cause the system to handle a greater than desired number of request messages, such reservation requests are typically small and should be accommodated without system degradation. Moreover, the number of intermediate switch devices on a home network, for example, is also small (e.g. 1-3), thus minimizing any concern of "flooding" the system with BW request broadcast messages.

As previously mentioned, in response to a BW request message and determination of availability, each switch responds with a granted Bandwidth allocation/reservation message BA 70 of its own acknowledging the required service. The BA message is threaded back upstream along the identical path by which the BW message was sent. If a switch does not have the required resources, it returns an error message 80 (shown in dashed lines) indicating bandwidth is unavailable back upstream toward the appropriate sending device. This enables the upstream switches to free any pending BW and/or enable another cascading switch configuration to be established within the network for accommodating the path request. In one configuration, each switch includes software for implementing a bandwidth reservation protocol, such as RSVP.

As shown in FIGS. 1-3, the reservation BW protocol can be initiated and terminated from adapters, gateways and ethernet endpoints. As previously discussed, in one configuration, use of MAC addresses by the switch device on a homogeneous ethernet network enables endpoint determination which terminates at the network boundary location, such as an adapter. In another configuration, use of IP addresses by the switch enables actual end to end device determination in a heterogeneous network, where the adapter operates as a switch and possibly performs ARP/RARP to determine end user device location for devices on external networks such as devices on an IEEE1394 AV cluster.

In another configuration, client endpoints may be required to periodically refresh a bandwidth request in order to maintain bandwidth reservation. The switch may include a clock 17 (FIG. 2A) operative to transmit a control signal to a processor within the switch operative for allocating the bandwidth in the event a refresh is not received within a predetermined time interval. If the refresh is not timely received, the allocation module releases the bandwidth and initiates tearing down the connection. In the event that a connection is accidentally shut down, the client device must recognize the condition (e.g. via determining lack of RTCP feedback message) and initiate a new BW request.

The present invention is embodied in machine executable software instructions within the switch device, and the present invention is carried out in a processing system by a processor executing the instructions. In other embodiments, hardwired circuitry may be used in place of or in combination with software instructions to implement the present invention. The computer instructions embodying the present invention may be loaded into memory from a persistent store such as a mass storage device and/or from one or more other computer systems over a network. For example, execution in some embodiments that downloaded instructions may be directly supported by the microprocessor and directly executed by the processor. Alternatively, the instructions may be executed by causing the microprocessor to execute an interpreter that interprets the instructions by causing the microprocessor to execute instructions which convert the instructions into a format that can be directly executed by the microprocessor. Thus, the present invention is not limited to any specific combination of hardware circuitry and software, nor to any particular source for the instructions executed by the switch device.

Although the invention has been described in terms of exemplary embodiments, it is not limited thereto. The appended claims should be construed broadly to include other variants and embodiments of the invention which may be made by those skilled in the art without departing from the scope and range of equivalents of the invention.

The invention claimed is:

1. An apparatus for providing reserved connections between end stations, in a network capable of providing prioritized communications, comprising:
 a switch in packet communication with the end stations,
 wherein the switch is adapted to detect and forward packets that contain prioritized data for priority processing, and packets that include requests for reserved connections according to a given reservation protocol,
 wherein the switch comprises a plurality of output queues associated with egress ports of the switch that correspond to different priorities associated with received priority packets,
 wherein the plurality of output queues comprise a plurality of additional output queues for reserved connections, wherein each additional output queue is established and associated only with requests for reserved connections and reserved connection data packets for one reserved connection path at a given time,
 wherein the switch, in response to intercepting a reserved connection request transmitted between end stations in a network, determines whether there is sufficient bandwidth available to establish a reserved connection path within the network, and if so, establishes a reserved connection path, allocates the bandwidth for the reserved connection path, and forwards the reserved connection request to the additional output queue associated with the reserved connection path, and for, in response to each packet received at the input of the switch, determines whether the packet is associated with the reserved connection path and forwards those packets to the additional output queue on the egress port associated with the reserved connection path for transport to the intended destination.

2. The apparatus of claim 1, wherein the network comprises an ethernet network.

3. The apparatus of claim 1, wherein a plurality of said switches are coupled to one another in cascading fashion between the end stations for providing the reserved connection path there between, each switch operable for receiving a reserved connection request, determining and allocating its own available bandwidth, and forwarding the reserved connection path request to the next downstream switch.

4. The apparatus of claim 1, wherein the switch determines which egress port is associated with the reserved connection based on an internal mapping table.

5. The apparatus of claim 4, wherein the switch is operable for forwarding the reserved connection request to all output ports when the internal mapping table does not include the requested destination address.

6. The apparatus of claim 3, wherein when one of said switches determines insufficient available bandwidth, said one switch is operable to generate a signal indicating denial of bandwidth allocation back toward the requesting device.

7. The apparatus of claim 1, wherein the switch operates at one of service layer 2 and service layer 3.

8. The apparatus of claim 1, wherein the reservation protocol is RSVP.

9. In an ethernet network system comprising a plurality of ethernet end stations, a switch for communicating packets of information between at least two of the end stations, the switch comprising:
   an input for receiving packets from one of the at least two end stations;
   a plurality of output queues associated with egress ports that correspond to different priorities associated with received priority packets, wherein the plurality of output queues comprise a plurality of additional output queues for reserved connections, wherein each additional output queue is established and associated only with requests for reserved connections and reserved connection data packets for one reserved connection path at a given time,
   a packet sorter responsive to each of the packets received at the input, for determining at least one of a) packet type; and b) packet priority, and placing each packet in a corresponding output queue corresponding to the priority of the packet when the packet type received is a priority type, and for placing received reserved connection data packets on at least one of the additional output queues when the packet type received is a reserved connection type and placing reserved connection requests transmitted between end stations on at least one of the additional output queues,
   a detector for detecting whether the received packet includes a request for a reserved connection according to a given reservation protocol, and
   an allocator responsive to the detection of a request for a reserved connection, for determining if there is sufficient bandwidth for establishing a reserved connection path between at least two end stations and allocating sufficient bandwidth for establishing the reserved connection path between the end stations.

10. The system of claim 9, wherein a plurality of switches are coupled to one another in cascading fashion between the end stations for providing the reserved connection path there between, and wherein each switch is operable for receiving a reserved connection request forwarded from an upstream device, determining and allocating its own available bandwidth, and directly forwarding the reserved connection path request to a next downstream device according to its own internal mapping table.

11. The system of claim 10, wherein each switch examines at least one of MAC address information and IP address information of each packet for processing said packet.

12. The system of claim 11, wherein the switch compares the input packet address information with pair addresses stored in memory, and wherein, if the pairs match, indicative of a reserved connection packet, the particular packet is sent to the at least one additional output queue.

13. A method for providing a reserved connection between end stations, in a network capable of providing prioritized communications, comprising:
   a first network switch device receiving and detecting prioritized packets and packets that include requests for reserved connections according to a predetermined reservation protocol;
   the first network switch device forwarding the prioritized packets and the packets that include requests for reserved connections and establishing a plurality of output queues, wherein each output queue is associated only with requests for reserved connections and reserved connection data packets for one reserved connection path at a given time;
   determining, by said first network switch device, whether sufficient bandwidth is available for establishing a reserved connection path based on an intercepted reserved connection request transmitted between end stations in a network; and, if so, establishing a reserved connection path between the end stations, reserving resources along the reserved connection path to provide the requested reserved connection along the reserved connection path, and allocating, one of the output queues for buffering the reserved connection request and reserved connection data packets to be transmitted on the reserved connection path between the end stations.

14. The method of claim 13, further comprising parsing in said first network switch device header information including ethernet address, IP address, and TCP address information to determine whether the received packet is a bandwidth reservation request message.

15. The method of claim 14, wherein MAC addresses are stored and compared with packet information for determining reserved connection stream packets and end station devices on a homogeneous ethernet network.

16. The method of claim 14, wherein IP addresses are stored and compared with packet information for determining reserved connection stream packets and end station devices on a heterogeneous network.

17. The method of claim 13, wherein reserving resources along the reserved connection path to provide the requested reserved connection along the reserved connection path comprises the first network switch device forwarding the reserved connection request to a second network switch device in the path downstream from the first network switch device.

* * * * *